Figure 8:
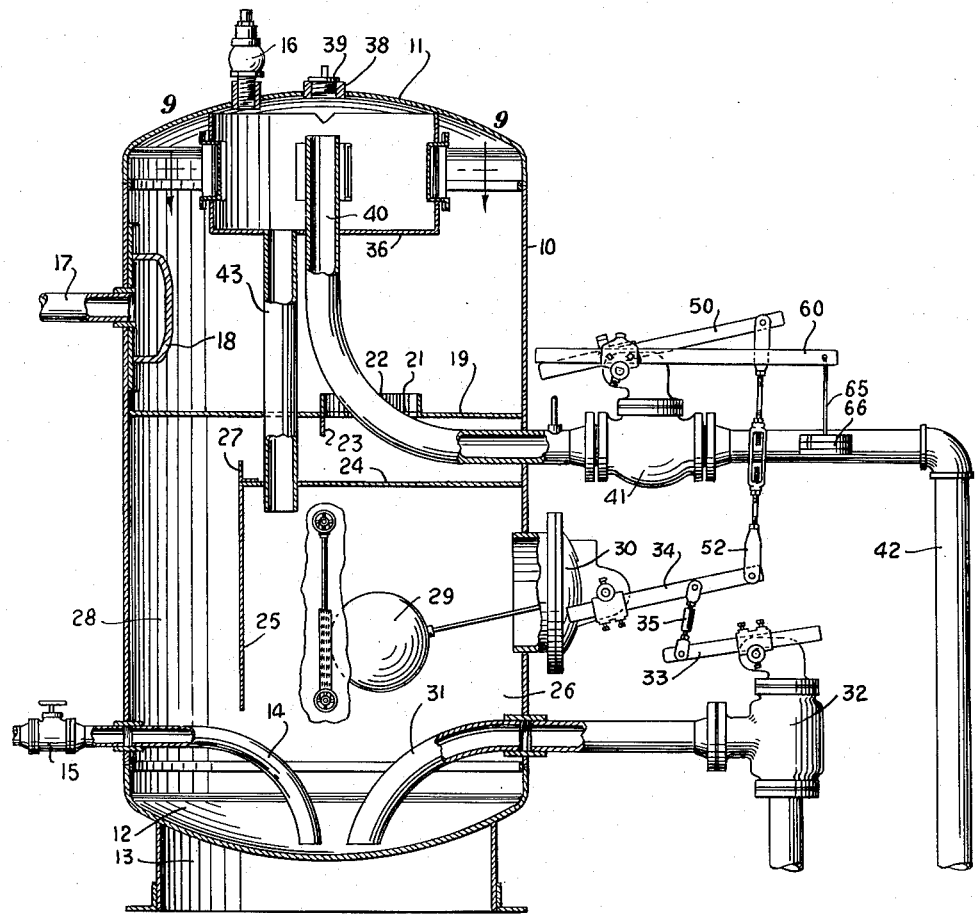

Aug. 22, 1961  J. P. WALKER ET AL  2,997,053
OIL AND GAS SEPARATORS
Filed June 3, 1957  3 Sheets-Sheet 1
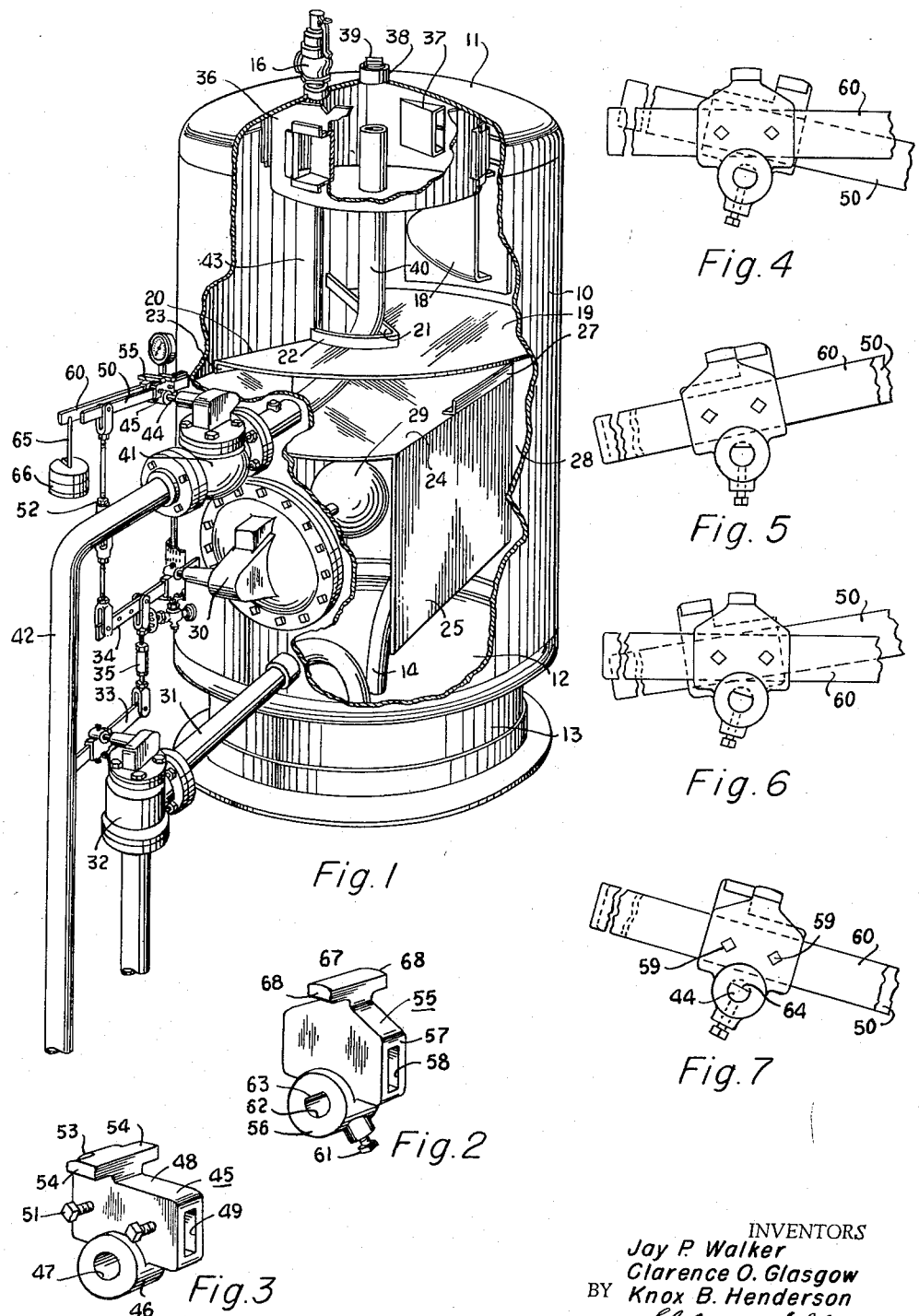
INVENTORS
Jay P. Walker
Clarence O. Glasgow
BY Knox B. Henderson
Ashley & Ashley
ATTORNEYS Aug. 22, 1961  J. P. WALKER ET AL  2,997,053
OIL AND GAS SEPARATORS Filed June 3, 1957  3 Sheets—Sheet 2

INVENTORS
Jay P. Walker
Clarence O. Glasgow
BY Knox B. Henderson

*Ashley & Ashley*
ATTORNEYS

INVENTORS
Jay P. Walker
Clarence O. Glasgow
Knox B. Henderson

BY *Ashley & Ashley*

ATTORNEYS

United States Patent Office 2,997,053
Patented Aug. 22, 1961

2,997,053
OIL AND GAS SEPARATORS
Jay P. Walker, Clarence O. Glasgow, and Knox B. Henderson, Tulsa, Okla., assignors to National Tank Company, Tulsa, Okla., a corporation of Nevada
Filed June 3, 1957, Ser. No. 663,129
6 Claims. (Cl. 137—202)

This invention relates to new and useful improvements in oil and gas separators.

The invention is particularly directed to oil and gas separators for receiving the flow streams of petroleum wells, the separator structures being particularly well adapted for utilization in relatively small separator vessels adapted to operate at pressures of several hundred pounds or less to afford a compact, efficient separator structure which thoroughly denudes the liquid petroleums of gas content and also affords relatively complete separation of recoverable liquids from the gaseous portion of the well stream.

The thorough separation of the oil and gas portions of the well stream has always posed a problem which usually has been solved by employing a relatively large separator vessel in order that a considerable portion of liquid may be accumulated therein and sufficient "residence time" afforded within the separator for this liquid to encourage the thorough separation of gas therefrom. Necessarily, such vessels are relatively expensive, especially as the operating pressures thereof increase, they are more difficult to transport from one location to another, and often more difficult to set into position and to connect to the various inlet and outlet pipes.

A first object of this invention is, therefore, to provide an improved oil and gas separator structure with which thorough and complete separation of oil and gas is obtained and yet which comprises a relatively small and inexpensive vessel.

Additional problems arise in the operation of almost any oil and gas separator in accordance with the varying well flow conditions which arise, as well as variations in the outlet or discharge conditions which may exist. Thus, it may sometimes be desirable to operate a separator at a relatively low inlet pressure, or even substantially atmospheric pressure. At the same time, it is often desirable to increase the pressure within the separator in order to provide sufficient driving force to flow the separated oil from the separator vessel into a storage tank or other place of retention. Further, well streams sometimes tend to surge and deliver large quantities of liquid into a separator within a very short period, and it is important under these conditions to prevent such oil from leaving the separator through the gas outlet pipe and thus being lost to recovery as well as creating hazardous and undesirable conditions. In other cases, restrictions or high resistance conditions may occur in the liquid or oil flow lines extending between the separator and the storage tanks which will reduce the rate of liquid discharge from the separator under its normal operating conditions, and it has sometimes been the practice to install oversized flow lines to cope with this problem. Obviously, such larger flow lines represent increased expense.

It is therefore, a further and important object of this invention to provide an improved oil and gas separator which may be set to operate at substantially atmospheric pressure or relatively low predetermined pressures, and wherein the pressure within the separator will be automatically increased to the necessary level to drive accumulated quantities of oil from the separator to the flow tanks, to overcome restrictions or partial blockages which may occur in the flow tank flow lines, and to temporarily restrict the rate of liquid inflow into the separator so that the danger of losing oil through the gas outlet pipe is avoided as well as the danger of providing too short a period of residence time for efficient separation of the well fluids.

It is an additional object of the invention to accomplish the foregoing by simple and automatic controls which function only during the period for which they are required, and which automatically reduce the separator pressure to the predetermined level as soon as the excessive flow of liquid into the separator has diminished or the excessive quantities of liquid accumulated within the separator have been discharged to tanks.

There are numerous advantages to operating an oil and gas separator at a very low back pressure or substantially no back pressure. When a well first commences to flow into the separator, the very low pressure within the separator will create a greater pressure differential across the well head permitting the utilization to greater benefit of gas entrained and dissolved in the liquid present in the well tubing. This functions to cause the well to flow or unload more quickly, and also results in a well having a longer flowing life or period of useful production. When a separator is connected to a gas-lift well under such conditions, less gas will be required for lifting the liquid from the well tubing into the separator, and thus, the cost of producing the well by gas-lift apparatus will be reduced.

In pumping wells, the use of excessive pressures on the oil and gas separator will reduce the tendency of the well to flow liquid into the separator, will reduce the efficiency of the well pump, and will cause greater rates of wear on the pump, the stuffing gland for the polish rod at the top of the well and other related equipment.

At the same time, use of very low separator pressures creates the problem of producing sufficient driving force for flowing the separated oil to the storage tanks, provides no means for resisting the sudden flow of surges or heads of oil from the well into the separator, and fails to prevent the loss of oil through the separator gas outlet line when volumes of liquid suddenly enter the separator. Further, restrictions in the liquid outlet lines of the separator may occur due to the size of the pipe employed, due to increased viscosity of the oil as lower temperatures are encountered, due to the presence of water or a vapor lock in the outlet line, and for other well known reasons. Thus, it is important that the pressure within the separator be increased as needed or required in order to flow liquid from the separator, to overcome restrictions in the outlet flow line, or to resist momentarily the sudden influx of large bodies of liquid into the separator.

Hence, it is an additional object of this invention to provide an improved oil and gas separator which accomplishes all of the foregoing desirable results, which provides for low operating pressures within the separator when such are desirable, and which automatically increases the separator pressure to such levels as may be required or desired when changes in flow conditions arise, all being carried out automatically and maintained only for such period of itme as the operating conditions may require.

Yet another object of the invention is to provide an improved oil and gas separator in which the well stream is repeatedly spread into a thin layer of large expanse whereby gas may more readily break free from the body of oil and be separated therefrom for effective separation and removal.

A construction designed to carry out the invention will be hereinafter described, together with other features of the invention.

Figure 9:
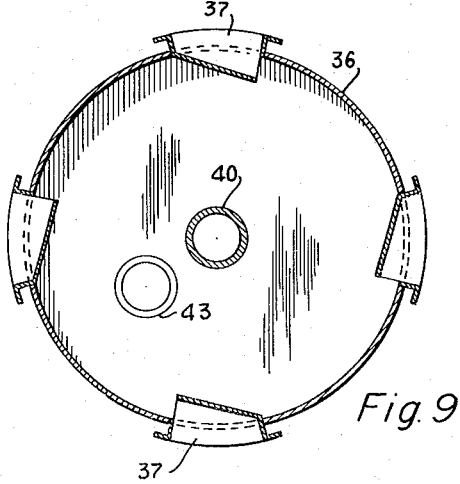
Figure 10:
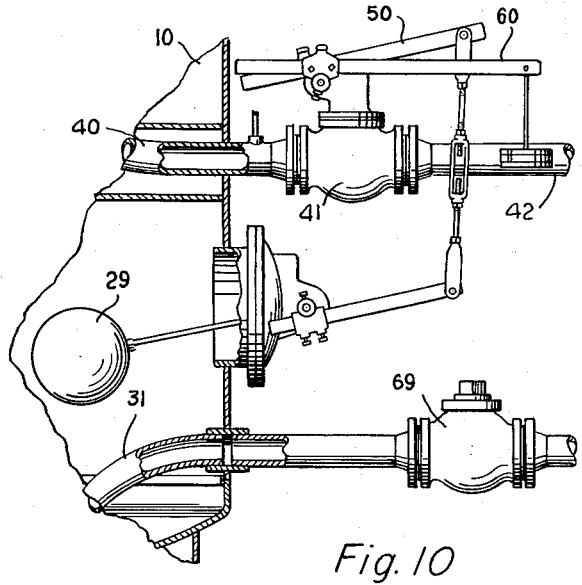
Figure 12:
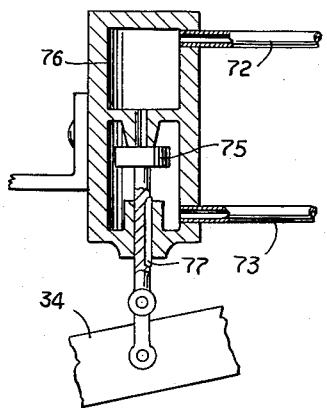
Figure 11:
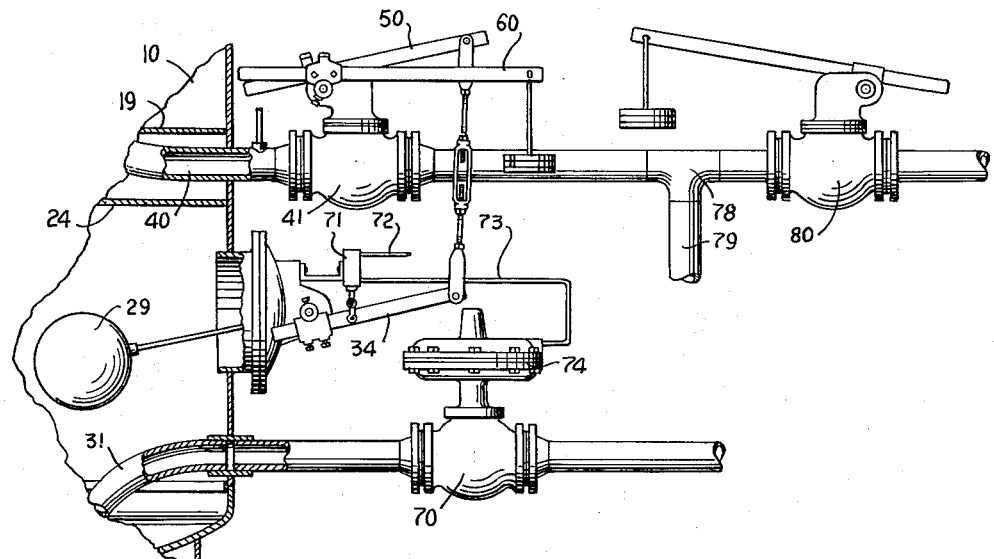

The invention will be more readily understood from a reading of the following specification and by reference to the accompanying drawings, wherein examples of the invention are shown, and wherein:

FIG. 1 is a view in perspective, partially broken away, illustrating an oil and gas separator constructed in accordance with this invention, FIG. 2 is a view in perspective of one of the gas valve fittings, FIG. 3 is a view in perspective of the second gas valve fitting, FIGS. 4 through 7 are fragmentary views in side elevation illustrating two arrangements of the gas valve fittings and the functioning thereof, FIG. 8 is a vertical, sectional view of the separator structure, FIG. 9 is a horizontal, cross-sectional view taken upon the line 9—9 of FIG. 8, FIG. 10 is a fragmentary view in side elevation illustrating a modification in the oil outlet connection for the separator, FIG. 11 is a view similar to FIG. 10 and illustrating a further modification of the oil outlet construction wherein a pilot-operated, oil discharge valve is employed, and FIG. 12 is a vertical, sectional view of the pilot valve.

In the drawings, the numeral 10 designates an upright cylindrical separator vessel having a domed head 11 at its upper end and a dished bottom 12 closing its lower portion. The vessel is carried upon the usual skirt or support 13 adapted to engage a ground-supporting surface. A curved drain or cleanout pipe 14 extends from the bottom of the vessel 10 through a cutoff valve 15, and a pressure safety release valve 16 is mounted in the head 11.

A well stream inlet pipe 17 enters the upper portion of the vessel 10 and has its inner end covered by a circumferential diverter plate 18 which directs the incoming well stream tangentially and circumferentially of the interior of the vessel 10 so as to spread the well stream in a wide, thin film traveling at relatively high velocity about the interior of the vessel 10 in a circumferential or peripheral path. At this point, the initial separation of the oil and gas is commenced, the gas tending to move upwardly toward the upper portion of the vessel 10 while the oil moves downwardly therewithin. Further, the spreading of the well stream in a wide thin layer exposes gas bubbles and encourages the bubbles in breaking from or through the surface of the relatively thin oil film, while the centrifugal forces due to the circuitous path of travel of the well stream exerts enhanced forces for moving the liquid portion of the stream immediately adjacent the inner wall of the vessel 10, while the gas, being lighter, is subjected to less force of this nature and is aided in separating from the oil film and moving toward the upper end of the separator.

A transverse partition 19 extends across the separator shell 10 below the oil inlet 17 and is substantially the form of a circular disk having a quarter sector removed therefrom. Thus, as shown in FIG. 1, the partition 19 forms a wide, flat tray surface extending from approximately beneath the diverter inlet 18 three quarters of the way around the circumference of the vessel 10 to the opening 20 provided by the removed quarter sector of the partition. Further, there is removed from the central portion of the partition 19 a substantially triangular portion to form an opening 21 through which a gas discharge pipe may extend, as will be described further hereinafter. A short upstanding lip 22 extends around the edges of the opening 21 and also along the radial edge of the plate 19 extending toward the backside of the diverter 18. The lip 22 of course retains the well stream liquids upon the partition 19 and insures that such liquids will flow circumferentially of the separator structure for approximately three quarters of the internal expanse of the separator wall before discharging downwardly in the separator over the radial edge of the plate 19 forming the opposite side of the opening 20. A depending stiffener 23 may or may not be provided upon the latter radial edge of the opening 20, as may be desired.

Thus, as the liquids gravitate downwardly in their circumferential flow path from the diverter 18, they are caused to spread over the relatively large expanse of the partition 19 and to continue their circumferential flow thereover in a thin film of large area before draining downwardly through the opening 20. Here again, the liquids are scrubbed against the surface of the plate 19, just as they were scrubbed against the inner surface of the upper portion of the separator shell 10, and are spread in a wide, thin film from which gas bubbles may more readily break.

A second gas removal and scrubbing partition 24 is provided in the vessel 10 spaced below the partition 19 and extends from beneath the opening 20 entirely across the separator to a point near the opposite wall thereof. This partition receives the oil draining through the opening 20 and again spreads it in a wide, thin film for scrubbing of gas therefrom and gravitational separation of gas by permitting the gas bubbles a very short path of travel before breaking through the surface of the oil. An elongate skirt 25 depends downwardly in the vessel from the edge of the partition 24 to a point adjacent the bottom of the vessel to create a quieting chamber 26 beneath the partition 24. Since there may still be some tendency of the oil to flow circumferentially of the separator over the surface of the partition 24, a short upstanding lip 27 may be provided along a portion of the edge of the partition in order to force the oil film to travel a maximum distance over the surface of the partition 24 before draining downwardly in the space or flume 28 formed between the skirt 25 and the adjacent wall of the vessel 10.

The quieting chamber 26 forms a relatively large liquid accumulation chamber in the bottom of the separator for receiving a liquid level float 29 extending through the side wall of the vessel through a conventional float mechanism 30. Under all normally expected operating conditions, the liquid level within the chamber 26 will be maintained above the lower extremity of the skirt 25, and hence, the latter forms a protective baffle which isolates the quieting chamber from the flume 28 and any turbulence created by oil cascading downwardly from the baffle 24. In this manner, a reasonably stable and quiet liquid level is provided for actuation of the float 29 and erratic operation of the float due to sudden surges of liquid into the separator structure is avoided. A curved oil discharge pipe 31 extends from the bottom of the separator immediately above the head 12 outwardly through the wall of the separator to a lever-operated oil discharge valve 32 of conventional construction and having its operating arm 33 connected to the float arm 34 through an adjustable link 35. Thus, as the float 29 is raised by a rising liquid level in the chamber 26, the oil valve 32 is opened to permit discharge of the accumulated oil, the dropping of the float 29, as the oil level in the chamber 26 falls, functioning to close the valve 32 as required.

Within the upper or topmost portion of the separator, there is provided a mist extractor drum 36 having a plurality of tangential gas inlet fittings 37 which direct separated gas circumferentially of the interior of the drum 36 for removal of fine liquid particles therefrom. The separated gas may be removed through an outlet fitting 38 provided in the center of the head 11, or as shown in the drawings, the outlet 38 may be closed by the plug 39 and the gas discharged through a discharge pipe 40 extending vertically downwardly through the center of the drum 36 and curving through the opening 21 into a horizontal plane between the partitions 19 and 24 to exit from the vessel through the side wall thereof. The gas outlet pipe 40 receives a lever operated gas discharge valve 41 from which the gas outlet pipe 42 extends to the point of use or disposal of the separated gas. Liquids separated from the gas within the drum 36 may drain downwardly through a vertical conductor 43 into the quieting chamber 26, and likewise, gas evolved from the liquid present within the quieting chamber may pass upwardly through the conductor 43 to the gas outlet 40.

The gas discharge valve 41 is quite unique and effective in its operation in that it is adapted to apply any predetermined back pressure to the separator through the gas discharge pipe 40 as may be found desirable or necessary. At the same time, the level of pressure maintained within the separator by the valve 41 may be varied or regulated through movement of the float 29 in order to increase or decrease the pressure within the separator as may be found most effective.

The gas valve 41 is of the usual and conventional lever-operated type and is provided with a laterally-extending operating shaft 44 by rotation of which the valve is opened or closed. A float arm fitting 45 is received upon the shaft 44, the fitting 45, as shown in FIG. 3, comprising a hub 46 having a circular opening 47 extending therethrough, and having a rectangular sleeve 48 formed integrally upon its upper portion. A rectangular slot 49 extends through the sleeve 48 at right angles to the opening 47, and thus, when the shaft 44 is received in the opening 47, a float-actuated arm 50 may be received within the opening 49 and clamped therein by set screws 51 so as to extend at right angles to the shaft 44. The hub 46 is not clamped upon the shaft 44 and hence the fitting 45 and its float-actuated arm 50 are free to rotate upon the shaft without affecting the open or closed condition of the valve 41. The arm 50 is pivotally linked to the float arm 34 through an adjustable rod or link connection 52. A boss 53 projects upwardly from one end of the sleeve 48 and carries a pair of laterally extending ears or lugs 54 which extend outwardly beyond each end of the hub 46 in a plane offset from the vertical axis of the fitting 45.

A second or weight-actuated fitting 55 is received on the shaft 44 outwardly of the fitting 45 and again includes a hub carrying on its upper portion a rectangular sleeve 57 having extending therethrough a rectangular opening 58. Set screws 59 (FIG. 7) are provided for clamping a weight-actuated bar 60 within the opening 58, and a set screw 61 is provided in the hub 56 for clamping the fitting upon the shaft 44. Further, the hub 56 is provided with a transverse opening 62 having one side flattened to form a key face 63 which engages a complementary key face 64 formed upon the outer end of the shaft 44. Thus, the fitting 55 is securely attached to the shaft 44, and rotation of the fitting results in rotation of the shaft. A suitable weight hanger 65 for receiving weights 66 is pivotally connected to the end of the bar 60.

The fitting 55 also is provided with an upstanding boss 67 having laterally-extending ears or lugs 68 vertically alined with the hub 56. Thus, as shown in FIGS. 5 and 7, when both fittings are placed upon the shaft 44 and the bars or arms 50 and 60 brought into alinement horizontally, the lugs 68 are brought into engagement with the lugs 54. Further, the fitting 45 may be positioned upon the shaft 44 so as to have its lugs 54 between the lugs of the fitting 55 and the outer ends of the arms 50 and 60, as shown in FIGS. 4 and 5, or the position of the fitting 45 may be reversed so as to place the lugs thereof between the lugs of the fitting 55 and the separator structure, as shown in FIGS. 6 and 7. These relative positions and the functioning thereof are illustrated in FIGS. 4 through 7, it being kept in mind that when the float 29 is elevated within the chamber 26 due to the accumulation of a body of liquid therein, the float arm or bar 50 is swung downwardly, as shown in FIGS. 4 and 7, whereas when the float is in its lower position due to a low liquid level, the float arm is in its upper position, as shown in FIG. 6.

The type of control connection illustrated in FIGS. 4 and 5 is adapted to separator operating conditions in which it is desired to apply substantially no back pressure to the well stream inlet 17 as liquid is accumulating within the lower portion of the separator structure, but to apply a fixed or predetermined back pressure to the separator as the liquid level therein rises and increased discharge of liquid under a pressure head from the separator becomes desirable. Thus, as shown in FIG. 5, when the float 29 is in its lower position, the lever arm 50 will be swung upwardly, causing the lugs 54 of the fitting 45 to engage the lugs 68 of the fitting 55 and thus remove from the shaft 44 of the gas valve 41 the force exerted by the weights 66 which tend to close the valve and maintain thereon a fixed back pressure. Under these conditions, the gas valve is moved to an open position, and substantially no or very little back pressure is maintained upon the separator, whereby the flow of the well stream from the well into the separator is greatly encouraged, and the beneficial effects discussed hereinabove are obtained regardless of whether the well is flowing under its own pressure or by pump or gas lift. As, however, liquid accumulates within the quieting chamber 26, the float 29 is caused to rise, thereby opening the oil valve 32 and moving the gas valve arm 50 to the position shown in FIG. 4 in which the lugs 54 are revolved from engagement with the lugs 68, and the weights 66 are again allowed to apply a biasing force to the gas valve through the arm 60 and the shaft 44 to maintain a predetermined back pressure from the separator. This application of a back pressure reduces the tendency of liquid to flow into the separator so freely, and at the same time, creates within the separator a pressure adequate for boosting or forcing separated liquids from the quieting chamber through the valve 32 to the storage tanks. Of course, as soon as the quantity of accumulated liquid has been reduced, the structure returns to the position shown in FIG. 5 where the back pressure upon the separator is again relieved.

In the arrangement of the controls shown in FIGS. 6 and 7, there is a constant back pressure applied to the separator at all times through the weight arm 60 which is never prevented from urging the gas valve 51 toward a closed position. In addition, however, as liquid accumulates in the quieting chamber 26 and causes the float 29 to rise, the float-actuated arm 50 is swung downwardly, bringing the lugs 54 into engagement with the lugs 68 and applying additional biasing force to move the gas valve toward a closed position. Thus, as the quieting chamber 26 is filling with liquid, the arms 50 and 60 are in the position shown in FIG. 6 and the back pressure applied to the separator is that determined by the mass of the weights 66 carried upon the weight arm 60. When, however, bodies of liquid accumulate within the quieting chamber 26, the force exerted by the float 29 is also applied to the shaft 44 through the interengagement of the lugs of the fittings 45 and 50, and the back pressure on the separator is rapidly increased to force additional quantities of separated oil or liquid to the storage tanks, to impede the rapid flow or rush of well stream fluids into the separator, to overcome restrictions or impedances in the oil discharge line, or to prevent the rapid rise of liquid within the separator structure to such point that the liquids might be discharged through the gas outlet pipe 40.

It is to be noted that the float-actuated arm 50 revolves on its fitting 45 freely upon the shaft 44 and does not directly apply any torque to the shaft 44 to open or close the valve 41. The weight arm 60 is directly connected to the shaft 44 and constantly exerts a pressure-closing force upon the valve 41 except for such times that such force is removed by the float-actuated arm, as shown in FIG. 5, or greatly enhanced by the float-actuated arm 50, as shown in FIG. 7. In all instances, the oil valve 32 continues to be opened and closed as required by the position of the float 29, but the pressure existent within the separator structure may vary widely, depending upon the position in which the fitting 45 is placed upon the shaft 44, the conditions existing within the separator structure, and the magnitude of the weights 66 suspended from the weight arm 60.

The structures and control connections herein described are subject to modification, as shown in FIGS. 10 through 12, it being desirable in some instances to replace the oil valve 32 with a simple check valve 69, as shown in FIG. 10. This arrangement is most suitably used with the valve controls illustrated in FIGS. 4 and 5 in which the separator is maintained at atmospheric conditions or substantially no back pressure so long as liquid is accumulating therein, and wherein the float functions merely to permit the weight arm to apply a back pressure to the separator for driving the separated liquids to the storage tanks.

The structure may also be modified as shown in FIG. 11 in which the oil valve 32 is replaced with a conventional diaphragm-operated valve 70 functioning through a gas supply pilot 71 operated by the float arm 34. Such gas pilot valves are conventional and well known, a typical structure being shown in FIG. 12 in which a supply of gas under pressure is admitted through the conductor 72 and thence through the conductor 73 to the diaphragm structure 74 of the valve 70 when the float 29 is in its elevated position and the valve core 75 of the pilot valve has been lowered within the pilot valve case 76. Conversely, when the float 29 drops, the supply of pilot gas under pressure from the conductor 72 is shut off, and the diaphragm housing 74 is permitted to exhaust through the conductor 73 and the gas exhaust outlet 77.

Lever-operated valves and diaphragm-operated valves are both well known in this art and are widely used, the diaphragm-operated valve having the advantage of opening and closing very quickly so as to prevent throttling through the oil outlet valve.

The gas discharge structure of the separator may also be modified as shown in FIG. 11 by the inclusion of a T 78 and branch gas supply conductor 79 downstream of the gas valve 41 and a weight-loaded gas discharge or back pressure valve 80 between the T 78 and the point of gas disposal or use. With this structure, a fixed back pressure may be maintained upon the discharge or outlet of the valve 41, and a supply of auxiliary gas made available through the branch conductor 79 for local use at the separator location or for such other use or disposal under pressure as may be necessary or desirable.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. A control system for oil and gas separators having oil and gas outlets, said system including, a gas outlet valve adapted to be connected to the gas outlet of a separator and constantly urged toward a closed position, and means responsive to the liquid level in the separator for applying a biasing force to the gas outlet valve, the means for applying the biasing force including convertible structure arrangeable in one of two positions when assembled, the convertible structure when arranged in a first position and when the liquid level is at a predetermined level applying the biasing force to augment the urging of the gas outlet valve toward a closed position, and the convertible structure when arranged in a second position and when the liquid level is at a predetermined level applying the biasing force to oppose the urging of the gas outlet valve toward a closed position.

2. A control system for oil and gas separators having oil and gas outlets, said system including, a lever operated gas outlet valve adapted to be connected to the gas outlet of a separator and having an operating element projecting therefrom, a first arm engaging the projecting element of the valve for constantly urging the valve toward a closed position, and a second biasing arm means movably mounted with respect to the projecting element of the outlet valve and the first arm and responsive to the liquid level in the separator for applying a biasing force to the gas outlet valve, the second arm means including convertible structure arrangeable in one of two positions when assembled, the convertible structure when arranged in a first position and when the liquid level is at a predetermined level applying the biasing force to augment the urging of the gas outlet valve toward a closed position by the first arm, and the convertible structure when arranged in a second position and when the liquid is at a predetermined level applying the biasing force to oppose the urging of the gas outlet valve toward a closed position by the first arm.

3. A control system for oil and gas separators having oil and gas outlets, said system including, a lever operated gas outlet valve adapted to be connected to the gas outlet of a separator and having an operating shaft, a first arm connected to the valve shaft for constantly urging the valve toward a closed position, a second biasing arm rotatable on the valve shaft and responsive to the liquid level in the separator for applying a biasing force to the gas outlet valve, the means for applying the biasing force including convertible structure arrangeable in one of two positions when assembled, the convertible structure when arranged in a first position and when the liquid level is at a predetermined level applying the biasing force of the second arm to augment the urging of the gas outlet valve toward a closed position by the first arm, and the convertible structure when arranged in a second position and when the liquid level is at a predetermined level applying the biasing force of the second arm to oppose the urging of the gas outlet valve toward a closed position by the first arm.

4. A control system for oil and gas separators having oil and gas outlets, the system including, a lever operated gas outlet valve adapted to be connected to the gas outlet of a separator and having an operating shaft, a first arm connected to the valve shaft for constantly urging the valve toward a closed position, a second biasing arm movably mounted with respect to the valve shaft and the first arm and responsive to the liquid level in the separator for applying a biasing force to the gas outlet valve, the means for applying the biasing force including convertible structure arrangeable in one of two positions when assembled, the convertible structure when arranged in a first position and when the liquid level is at a predetermined level applying the biasing force of the second arm to augment the urging of the gas outlet valve toward a closed position by the first arm, and the convertible structure when arranged in a second position and when the liquid level is at a predetermined level applying the biasing force of the second arm to oppose the urging of the gas outlet valve toward a closed position by the first arm.

5. A control system as set forth in claim 4 wherein the convertible structure includes projections connected to the two arms for engaging as the arms swing with respect to one another, the projection of the second arm engaging the projection of the first arm on one side when the convertible structure is arranged in the first position and engaging the projection of the first arm on the opposite side thereof when the convertible structure is arranged in the second position.

6. A control system for oil and gas separators having oil and gas outlets, said system including, a gas outlet valve adapted to be connected to the gas outlet of a separator, means constantly urging the gas outlet valve toward a closed position, and means responsive to the liquid level in the separator for applying a biasing force to the gas outlet valve, the means for applying the biasing force including convertible structure arrangeable in one of two positions when assembled, the convertible structure when arranged in a first position and when the liquid level is at a predetermined level applying the biasing force to oppose and overcome the force exerted by the means constantly urging the valve toward a closed position and upon rising of the level to progressively decrease such opposing until the level rises to a point at which the biasing force is completely removed, and the convertible structure when arranged in a second position and when the liquid level is at a predetermined level applying no biasing force and upon rising of the level reaching a point of beginning to apply the biasing force to augment the force applied by the means constantly urging the valve toward a closed position and progressively increasing such augmenting as the liquid level continues to rise.

References Cited in the file of this patent

UNITED STATES PATENTS

| | | |
|---|---|---|
| 1,581,371 | Weisgerber | Apr. 20, 1926 |
| 1,897,332 | Raymond | Feb. 14, 1933 |
| 1,897,398 | Raymond | Feb. 14, 1933 |
| 2,661,758 | Persha | Dec. 8, 1953 |
| 2,756,837 | Lovelady et al. | July 31, 1956 |
| 2,795,236 | Thomas et al. | June 11, 1957 |